June 28, 1932.  T. F. BALL  1,864,575
MEAT AND FOOD GRINDER
Filed May 17, 1930
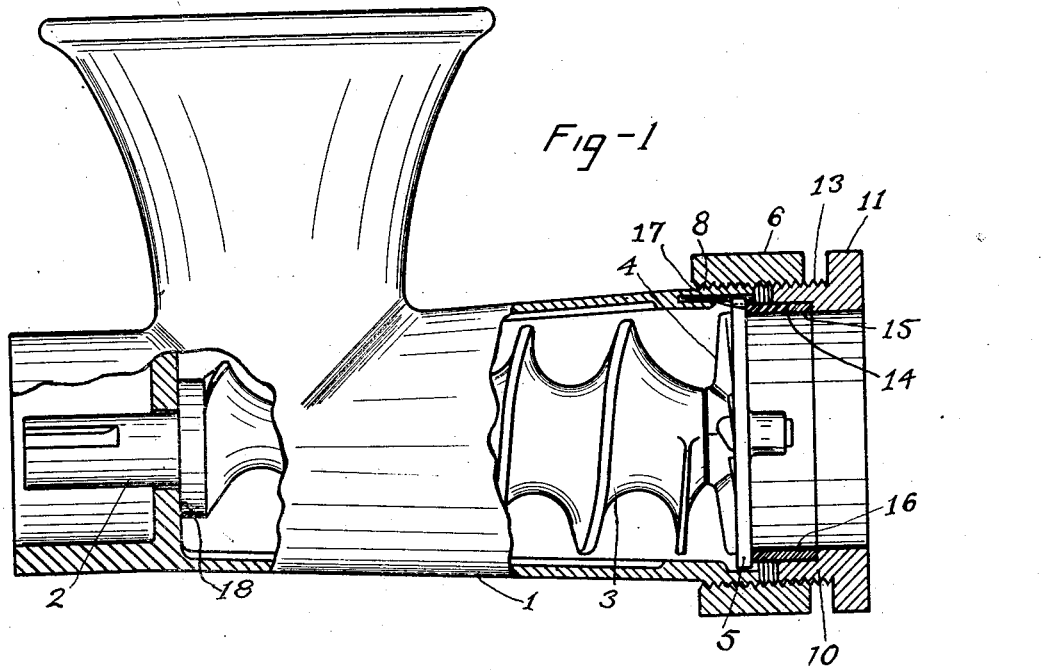
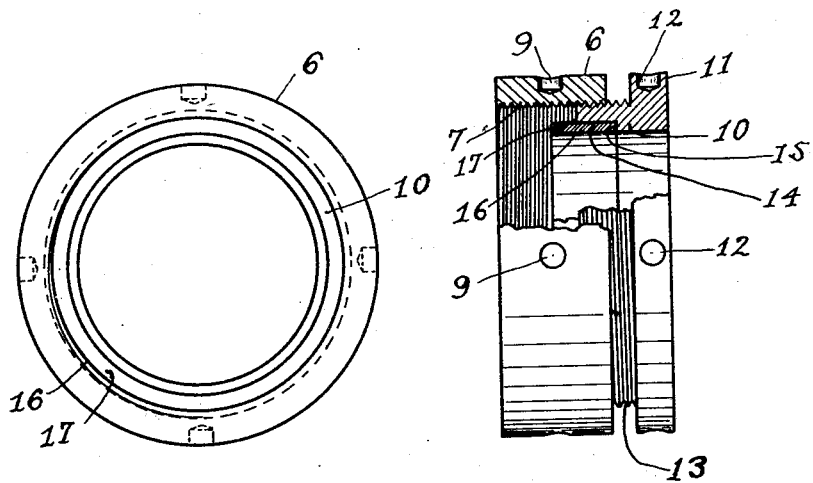
INVENTOR.
Thomas F. Ball
BY
ATTORNEYS.

Patented June 28, 1932

1,864,575

UNITED STATES PATENT OFFICE

THOMAS F. BALL, OF KANSAS CITY, MISSOURI

MEAT AND FOOD GRINDER

Application filed May 17, 1930. Serial No. 453,124.

The invention relates to grinding machines for grinding meat and other food, and more particularly to an improved clamping device for holding the knife plate in the usual grinding machine.

The usual nut employed in food and meat grinders for clamping the knife plate against the cutting knife will not clamp the plate in cutting position against the knife after the plate is worn or ground thin, necessitating the procuring of a new knife plate, and the screw threads on the body of the grinder become worn from frequent screwing of the clamp nut off and on the body to change and grind the knife plate, so that the nut eventually will not hold the knife plate in cutting position against the knife. Clamp nuts have been devised that will clamp a thin knife plate but this type of nut has been found so expensive and difficult to make that it has not come into use, it also is subject to the objection of becoming worn in the screw and of wearing the screw threads on the body of the grinder so that it will not clamp the knife plate in cutting position against the knife.

The present invention has provided an improved clamping nut for securing and maintaining the knife plate of meat and other food grinders in working position against the knife after the plate becomes thin from many grindings and after the screw threads have become worn and largely stripped from the body of the grinder.

A further object of the invention is to so construct and form the clamping nut that it will be easily and cheaply made.

With these and other objects in view, the invention consists in the features of construction, combinations and arrangements of parts hereinafter set forth and more particularly pointed out in the appended claims, the accompanying drawing illustrating a form of the improved clamping nut that has proven very satisfactory to the user.

In the drawing:

Fig. 1 is a view in elevation of a meat and food grinder with the improved knife plate clamping nut mounted thereon in working position, the view being broken open to show the interior.

Fig. 2 is a face view of the nut from the side nearest to the body of the grinder when the nut is applied.

Fig. 3 is a view of the nut at a horizontal angle of ninety degrees from that of Fig. 2, the nut being broken open to show the interior construction.

The body 1, shaft 2, feed worm 3, knife 4 and knife plate 5 are of common and well known form and construction.

The sleeve nut 6 is provided with the internal screw thread 7, which meshes with and in the screw thread 8 on the body 1. The screw thread 8 has usually become partly worn off and stripped when the knife plate 5 becomes thin from wear and grinding, and the nut 6 is screwed on past the worn threads until it is tight enough on the body 1 to be rigidly connected therewith. The holes 9 in the nut 6 are to engage an ordinary wrench by which the nut is screwed upon the body 1.

The interior diameter of the nut 6 is the same from end to end thereof and is larger than the knife plate 5 so that the plate is applied and removed and ground at will without removing the nut 6, in fact the nut 6 once placed rigidly on the body 1 may remain indefinitely or for the remainder of the life of the grinder.

The nut 10 is preferably as shown provided with the radially extending annular flange 11 and the holes 12 for the engagement of a common wrench to tighten and loosen the nut. The nut 10 projects from the flange 11 and is provided with the external screw thread 13 which meshes in and engages the internal thread 7 of the nut 6. The nut 10 is counterbored at 14 and provided with the internal shoulder 15, and in this counterbore and resting against the shoulder 15 is the hoop shaped clamp sleeve 16, the end 17 of the sleeve resting against and clamping the knife plate 5, so that when the nut 10 is tightened it clamps the knife plate 5 against the knife 4, the knife in turn clamping the feed screw 3 against the shoulder 18 in the body 1.

The forming of the sleeve 16 separately from the nut 10 is of particular importance and advantage, as it is necessary owing to the construction of the grinder to provide the nut 10 with a thin edge in a radial direction to bear against the knife plate 5 and the separation in parts of the nut and sleeve allows the nut to be formed of a metal that is easily provided with the screw thread 13 and the sleeve of a comparatively hard metal that will not be crushed owing to the thin edge of the end 17 thereof clamping the knife plate 5.

A further advantage of the sleeve 16 is found in that it is fitted loosely in the nut 10 and forms a washer for the nut to turn upon and against so that the nut will not chafe upon the knife plate when and as the nut is tightened against the plate.

It is understood however that the sleeve 16 is free to turn upon the knife plate 5 as well as in the nut 10 and that it will form a floating bearing between the knife plate and the nut, the slippage of the ring 16 occurring at the point of least resistance.

From the foregoing it will be clear that the nut 10 with the sleeve 16 will clamp the knife plate 5 to cutting position no matter how thin the plate may be worn and ground, as there is a distance between the nut 6 and the flange 11 greater than the thickness of the plate 5.

The improved knife plate clamping nut is of chief importance for the renewing of otherwise worn out bodies and knife plates of grinders for grinding meat and the various food that is ground in grinding machines, and may be advantageously employed in the construction of new grinders.

Having described my invention, what I claim as new and desire to secure by Letters Patent, is:

1. In a knife plate clamping device for meat and food grinders, a sleeve shaped nut internally screw threaded from end to end thereof, said thread meshing with the external screw thread of meat and food grinder bodies, a sleeve shaped nut externally screw threaded to mesh with said internal screw threads and provided with a counter bore terminating in an internally radially disposed shoulder, a thin hoop shaped sleeve resting in said counterbore with one side thereof abutting said shoulder and the opposite side thereof abutting the knife plate of the food grinder, said hoop shaped ring free to turn on said knife plate, and said externally threaded nut free to turn around said hoop shaped sleeve so that said hoop shaped sleeve forms a floating bearing between said externally threaded nut and the knife plate.

2. In a replacement device for meat and food grinders that are provided with externally screw threaded bodies, a sleeve shaped nut internally screw threaded and meshing with the external screw threads of meat and food grinders, a sleeve shaped nut externally screw threaded to mesh with said internal screw threads and provided with a counter bore terminating in an internal radially disposed shoulder, a thin hoop shaped sleeve resting in said counter bore with one side thereof abutting said shoulder and the opposite side thereof abutting the knife plate of the food grinder.

THOMAS F. BALL.